United States Patent [19]

Puch, Sr. et al.

[11] 3,968,842

[45] July 13, 1976

[54] TOMATO PLANT HARVESTING APPARATUS

[76] Inventors: Erwin F. Puch, Sr.; Erwin F. Puch, Jr., both of P.O. Box 3043, Orlando, Fla. 32802

[22] Filed: Apr. 7, 1975

[21] Appl. No.: 566,028

[52] U.S. Cl.................................. 171/11; 53/391; 171/25; 171/61; 214/518
[51] Int. Cl.²........................................ A01D 19/12
[58] Field of Search ................... 171/61, 11, 14, 20, 171/25, 27, 28, 116, 141; 53/391; 214/518, 6 H, 82

[56] References Cited
UNITED STATES PATENTS

| 1,426,767 | 8/1922 | Pettengill | 171/61 |
|---|---|---|---|
| 3,106,249 | 10/1963 | Zackery | 171/14 |
| 3,743,024 | 7/1973 | Mayo et al. | 171/61 |
| 3,889,824 | 6/1975 | Wood | 214/6 H |

Primary Examiner—J.N. Eskovitz
Attorney, Agent, or Firm—Duckworth, Hobby, Orman, Allen & Pettis

[57] ABSTRACT

A plant picking and boxing apparatus is mounted on a wheeled frame and includes an engine for driving the wheeled frame by a hydraulic system. Parallel mounted endless belts are supported on the frame and grip tomato plants, or the like planted in rows, and transport the plants into a loading mechanism. The plant roots are cleaned by rotatable, flexible flaps hitting the roots of the plants being transported between the parallel belts. The loading box has microswitch to determine when it is filled and ready for shifting to a second box, and to allow the plants to be pushed from the loading box into a packaging container where they can be placed on a conveyor and be conveyed to a closing platform on the wheeled frame.

21 Claims, 12 Drawing Figures

TOMATO PLANT HARVESTING APPARATUS

BACKGROUND OF THE INVENTION

The present invention relates to a plant harvesting machine, and especially to a machine for pulling tomato plants from the earth and cleaning the roots and packing the plants in containers.

In the past, a great variety of havesting machines have been provided for harvesting all types of crops, working on a great variety of principles. One common type of vegetable harvestor includes machines for harvesting celery and the like, by pulling the plants from the earth and placing the pulled plants in containers for later processing. Many of these harvesting machines utilize a pair of parallel belts for gripping and conveying the plants being harvested and one such apparatus would harvest small pine trees for replanting at a later time. It has also been suggested in U.S. Pat. No. 3,743,024 to harvest tomato plants utilizing rotating belts for pulling tomato plants in addition to oscillatory blades for cleaning the roots of the plants while they are being conveyed. The present invention endeavors to overcome some of the disadvantages of the prior patents in the development of a machine designed primarily for harvesting and immediately packaging small tomato plants for replanting. The plants now are planted in rows in fields where they are grown to a predetermined size and then pulled up with the roots and packed in small bundles for sale. For instance, plants can be grown from seeds in a warm climate and packed and shipped further north after the climate gets warm enough for growing tomatoes thereby assuring an earlier crop in areas with more limited growing seasons.

The present invention more fully automates harvesting machines utilizing parallel running endless belts for gripping and conveying plants pulled from the earth by providing a more automated boxing system in which large groups of plants are continuously packed until the container is filled, at which time the container shifts out of the way, shifting a second container in place to receive the plants. The first container can thereby be unloaded into boxes of predetermined shapes for immediate transfer in the field to transport and shipping facilities, thus significantly reducing handling requirements.

SUMMARY OF THE INVENTION

The present invention relates to a plant pulling and packing machine having a frame with chassis and wheels steerable by an operator. A power source is mounted onto the frame for driving the wheels and operating the packing and pulling portions of the machine. One or more pairs of parallel mounted endless conveyor belts are attached adjacent to each other so that the belts will engage a plant protruding from the earth and transport it through the belts to a loading box which receives the plants until the loading box is filled. Rotatable, flexible flaps are located beneath each pair of endless belts for cleaning the roots of the plants being transported thereon, and the loading box has means for shifting from a full loaded box to an empty box without interrupting the operation of the machine, thus allowing the plants in the loaded box to be packed in a carton and temporarily stored on a platform on the frame suitable for immediate shipment.

BRIEF DESCRIPTION OF THE DRAWINGS

Other features and advantages of the invention will be apparent from the written description and from the drawings in which.

DESCRIPTION OF THE PREFERRED EMBODIMENT

Referring now to the drawings and especially to FIGS. 1 through 4, a plant pulling and boxing machine 10 is illustrated having a frame 11 including a chassis 12 and a plurality of front wheels 13 and rear wheels 14. The front wheels 13 are held by axle pins or shafts 15 to a steering yoke 16 which is in turn attached to a shaft 17 riding in the chassis frame 12. The steering shafts 17 have arms 18 attached thereto; and through yokes 20 of hydraulic cylinder 21, rods 22 generate the torque to rotate the shafts 17 in accordance with the operation of the hydraulic cylinder 21 which is attached by pins 23 to the chassis 11. Hydraulic cylinder 21 is controlled by valves by the operation of a steering wheel 24 mounted to the chassis 12 by frame member 26. Cylinder 21 on the side of the machine 10 actuate both wheels 13 simultaneously for steering the vehicle through tie rod 25. The rear wheels 14 are connected through hubs to the rear axle 27 connected to a differential 28 which in turn is driven by a hydraulic motor 30, driven through a universal joint 31, so that actuation of valves to control the hydraulic motor 30 in a forward or reverse direction will drive the rear wheels 14 to move the machine 10. The machine 10 has a drivers seat 32 placed behind the steering wheel 24 along with a control panel 33 mounted therebeside and an internal combustion or other engine 34 mounted on the front of chassis 12 with engine 34 supplied from a fuel tank 35 for driving a plurality of belts 36 riding in pulley 37 connected to the output shaft 38. The belts 36 in turn drive a pulley 40 attached to a shaft 42 which is held with bearings mounted in brackets 41 and attached to a chassis member 43. Shaft 42 drives a plurality of hydraulic pumps 44 which are connected to a hydraulic fluid reservoir 45. The fluid reservoir and the pumps actuate the cylinders 21 for steering the wheels 13 and also actuate the hydraulic motor 30 to drive the rear wheels 14 in a forward or reverse direction, as well as other mechanisms as will be described hereinafter.

The frame 11 also includes an upper frame section 46 for holding onto when riding or getting on or off the machine, as well as platforms 47 on either side of the machine for workers or operators to ride on while the machine is in operation. A seat-holding post 48 is attached to the chassis 12 portion of the frame. The object of the machine is to ride along the earth 50 to pick rows of planted plants 51 which may be small tomato plants or the like. The picking is accomplished with pairs of endless conveyor belts 52 running on a plurality of staggered idlers 53 and riding adjacent to each other between the small idlers 53. The belts 52 wrap around end rollers 54 and upper end rollers 55. The end rollers 54 provide a portion of the belt that engages each tomato plant 51 between the belts for lifting the tomato plants 51 from the earth and allow them to ride between the belts 52 which transport the plants to a higher level and to a loading box 57 or 58, which loading boxes are mounted side by side. The endless conveyor belts are driven by hydraulic motors 60 which drive chain 61 and shafts 62 to drive the belts. The belts are mounted upon a framework 63 which is supported at the upper end by frame member 64 pinned at 65 to the framework 63 and attached to the chasis 12 thus allowing the framework 63 belts and associated mechanism to be rotated on the point 65 which allows adjustments between the end of the transporting belts 52 and the earth 50. Raising and lowering is accomplished with a link 67 pinned to frame 63 by pin 68 which link 67 is also pinned at 70 to an arm 71 which is pinned at 72 to the chassis 12. Arm 71 is elbow-shaped and connected to a yoke 73 pinned with a pin 74 to the hydraulic cylinder rod 75 of a hydraulic cylinder 76. Hydraulic cylinder 76 is attached by pin 77 to the frame 11 so that actuation of the hydraulic cylinder 76 will in turn actuate arm 71 and link 67 to raise or lower the frame 63 on pin 65 for adjusting the machine for different sized plants being pulled from the earth. Frame 63 also has a plurality of flexible flaps or blades 80 attached to elongated shaft 81 running on bearings 82 and driven by a hydraulic motor 83 upon actuation by the driver through the control panel 33. Blades 80 are located directly beneath the parallel belts and are rotated to hit the roots of plants being conveyed by the belts to remove the dirt and chaff from the plants prior to the plants being fed into the loading boxes.

Figure 1:
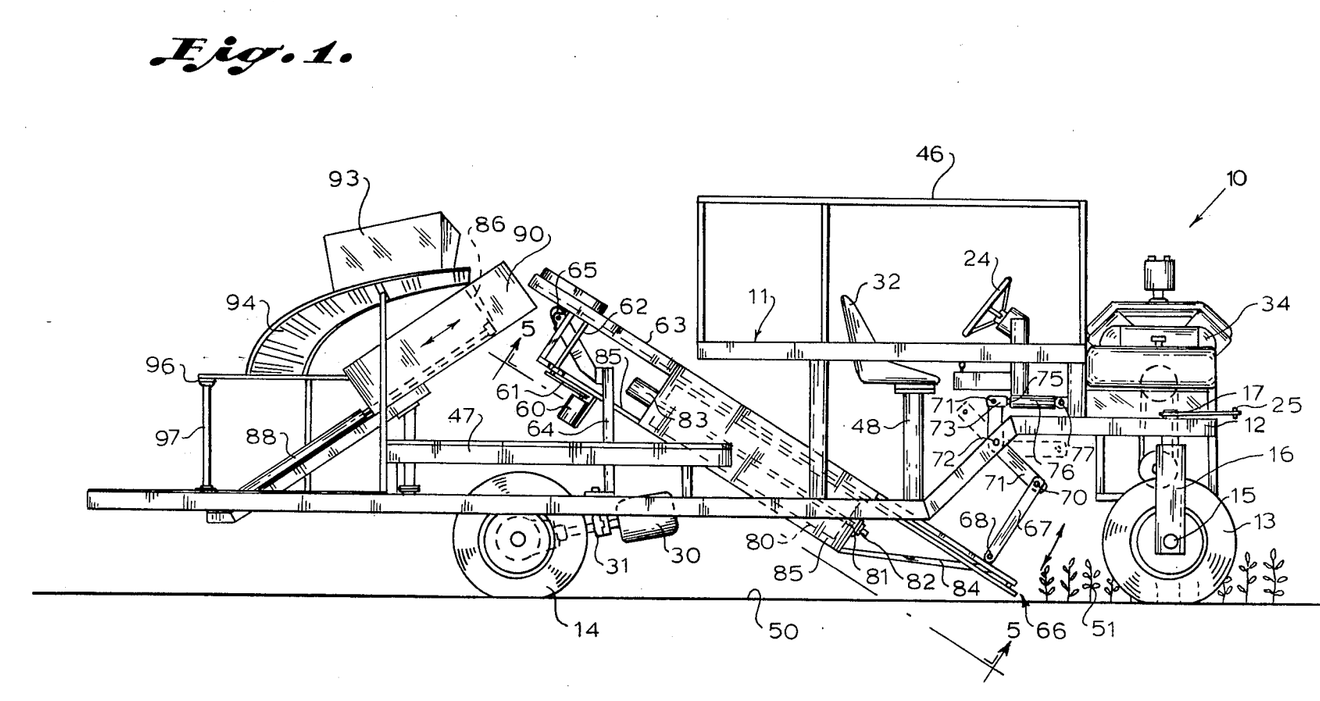
FIG. 1 is a side sectional view of a tomato plant harvesting machine in accordance with the present invention.
Figure 2:
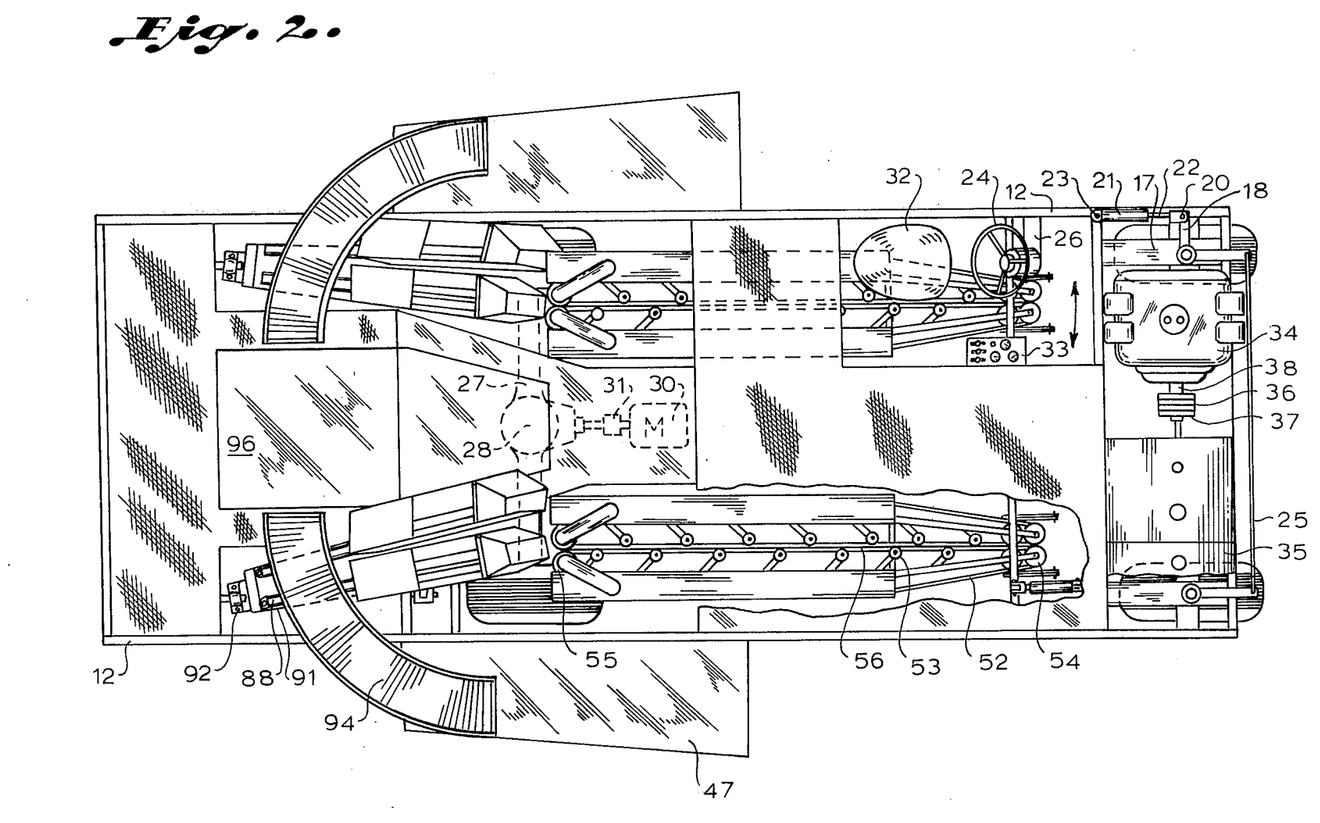
FIG. 2 is a top sectional view of the harvesting machine in accordance with FIG. 1.
Figure 3:
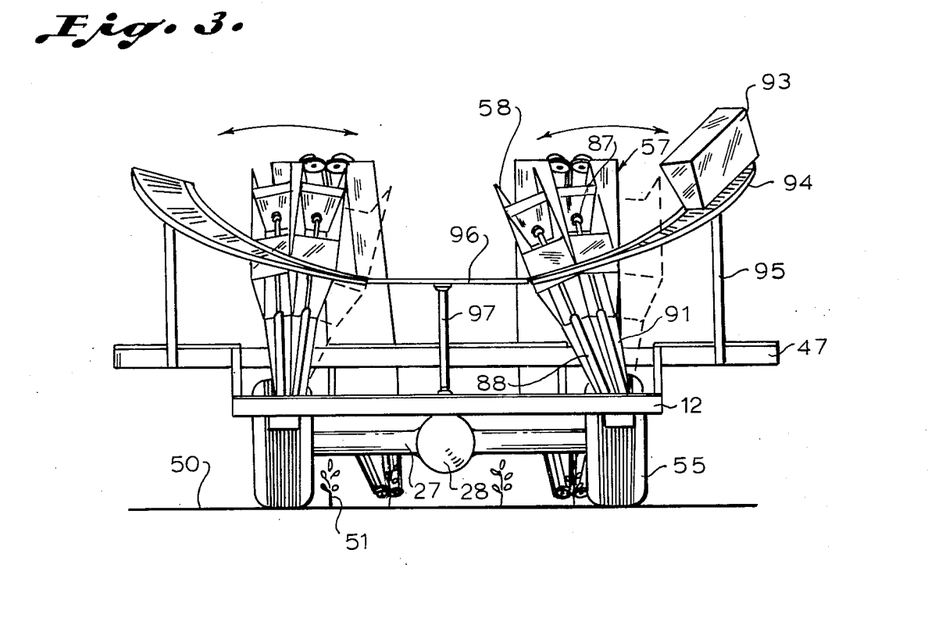
FIG. 3 is a rear sectional view.
Figure 4:
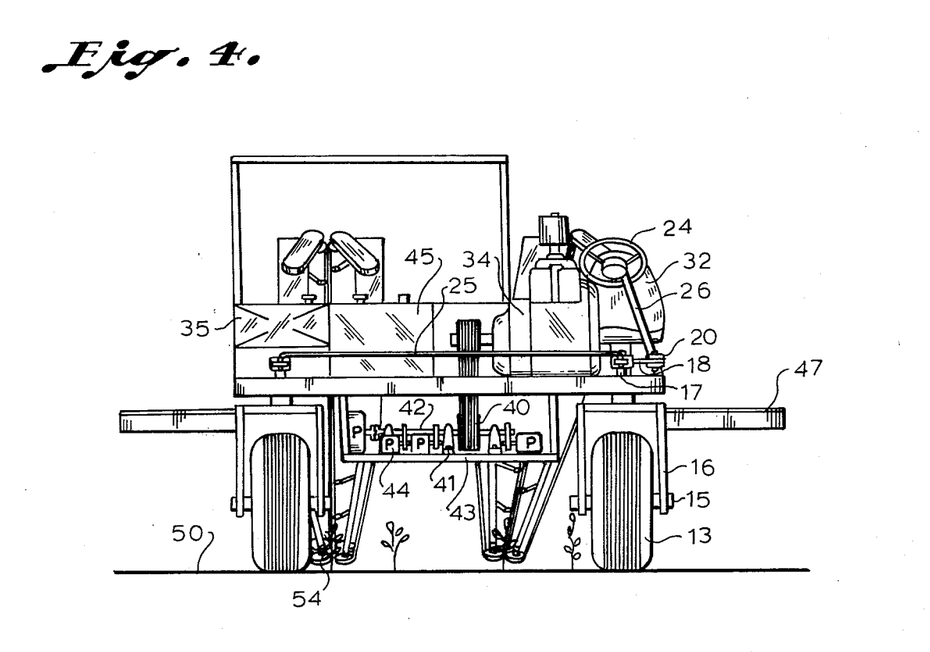
FIG. 4 is a front sectional view.

The shaft 81 is supported to frame 63 which in turn is braced with bracing members 84 and 85. Thus, the plants are pulled from the earth by the belt, conveyed through the conveyor belts to the loading boxes while having their roots cleaned of dirt and chaff by the rotating flexible flaps 80. Loading box 57 and 58 each have a predetermined shape as illustrated and have movable bottom members 86 therein supported by hydraulic cylinder rods 87 which are in turn connected to hydraulic cylinders 88. As the plants are fed into the front portion 90 of the boxes 57 or 58, the bottom portions 86 are gradually pushed back until they reach the bottom of the container portions 90 at which point a microswitch is activated which shifts the box being loaded to one side while moving the other box in position for receiving plants. That is, once the box 57 is filled, it will automatically shift to the right to allow box 58 to position itself in front of the conveyor belts to receive plants being fed by the conveyor belts. Each pair of boxes 57 and 58 are held upon a single frame work 91 having cylinders 88 mounted thereto and attached by brackets 92 to the chassis 12 so that they can rotate relative to the framework upon actuation of a hydraulic cylinder as will be described in more detail hereinafter. As box 57 is filled and shifted out of the front of the conveyors the operator standing on a platform 47 can slide a box 93 of the same general shape but slightly larger than the receiving portion of the loading box 90, then actuates a microswitch operating a valve to drive the cylinder 88 to move the bottom plate 86 to push the plants forward thereby pushing the plants into a separate box 93 which box can be closed by the operator standing on the platform 47 and placed upon a conveyor 94 supported by a vertically extending rod 95 attached to the platform 47. The conveyor 94 conveys the box 93 down to a table 96 where it can be temporarily stored pending the sealing of box 93 and conveyed rearward to a storage trailer. The present machine illustrates two sets of conveyors 94, as well as two sets of boxes 57 and 58 and two sets of plant picking and conveyor mechanisms which are adapted to pick rows of plants 51, as illustrated in FIG. 3, two rows at a time prior to coming down another row and picking two more rows including one of the intermediate rows illustrated in the figure. It should, however, be clear that either one, or more than two, mechanisms could be operated from the same wheeled frame or vehicle without departing from the spirit and scope of the invention. Conveyor 94 is attached to the table 96 which in turn is attached to a vertical rising post 97 which is attached to the chassis 12 of the frame 11 for support.

Figure 5:
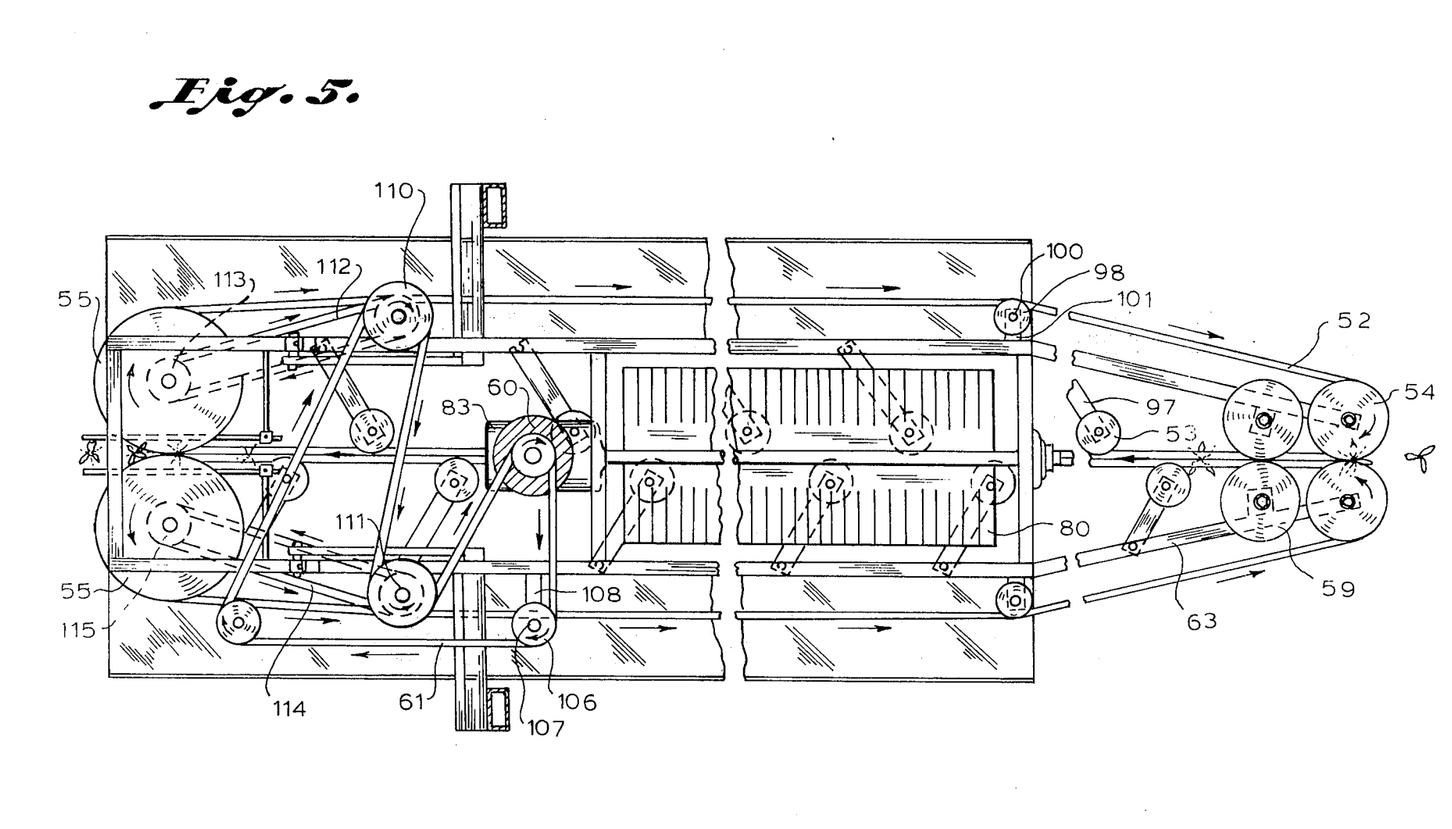
FIG. 5 is a sectional view taken along the line 5—5 of FIG. 1.
Figure 6:
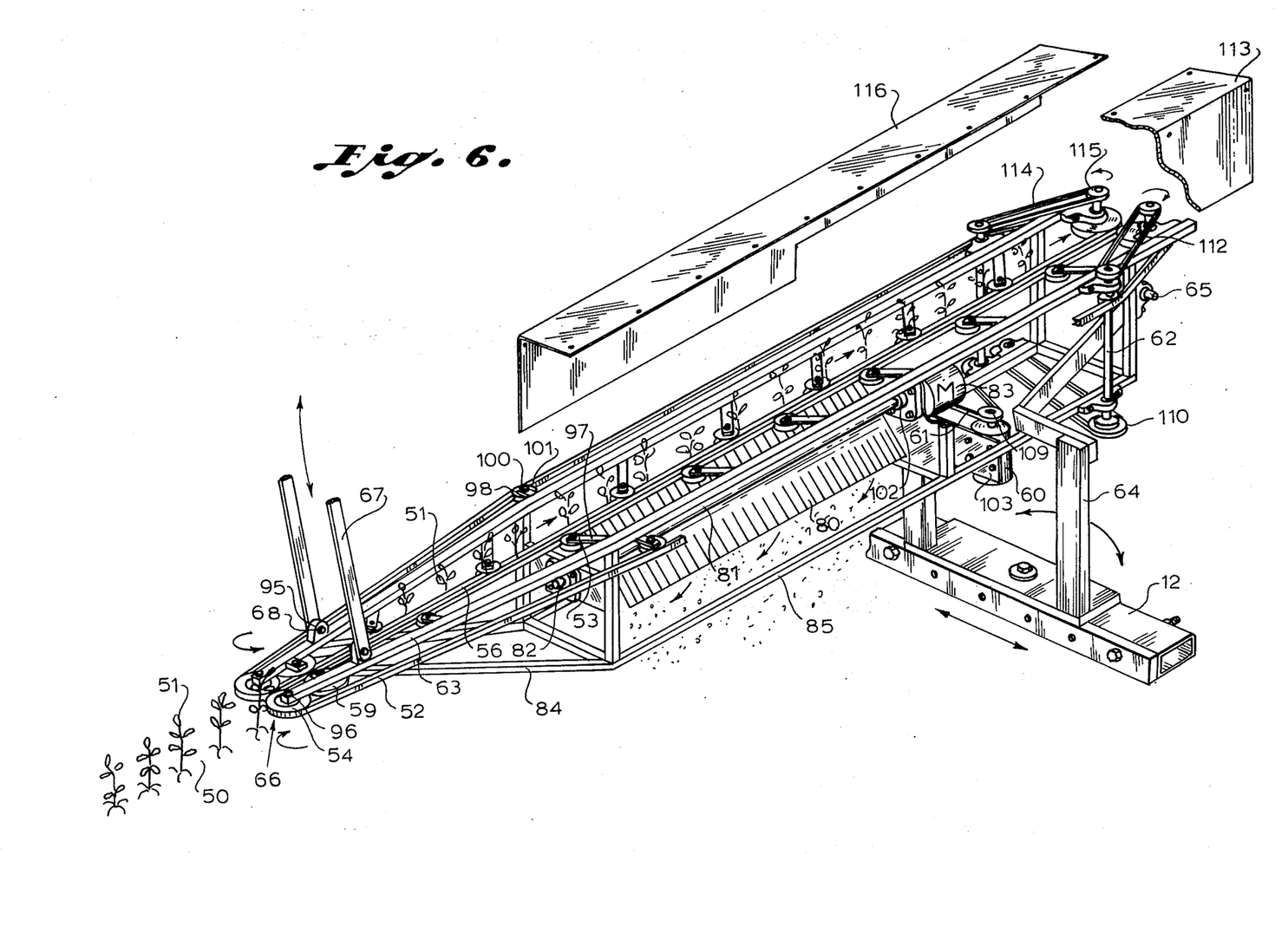
FIG. 6 is a perspective view of the plant picking and transporting system along with the root cleaning system with the cover removed to show the plants being transported by the belts.

Referring now to FIGS. 5 and 6, the plant picking and conveying system and root cleaning system are more clearly illustrated having the adjustable support link 67 supporting the end 66 by means of pins 68 attached to brackets 95 attached to the conveyor system frame 63. The conveyor system frame has pulleys 54 at one end pinned with pins 96 to the frame 63 for the conveyor belts 52 to pass around and has a plurality of staggered idlers 53 attached to arms 97 which are in turn attached to the frame 63 and which holds the parallel portions of the belt 52 and inner portion 56 together for closer alignment for holding and conveying plants 51. The outside of the belt 52 is supported by idler rollers 98 rotatably attached with pin 100 to brackets 101 which in turn are attached to the frame 63. Frame 63 is supported by a support framework 85 which also supports the bearings 82 and 102 which rotatably hold the shaft 81 which supports the rotatable flexible flaps or blades 80. Beneath the conveyor belt 52, the rear portion of the picking and transporting section is supported by frame member 64 attached to the chassis 12 which is pinned at 65 to movably support the opposite end of the frame 63 from end 66. Motor 83 is connected to shaft 81 for rotating the shaft when actuated and a second hydraulic motor 60 mounted to a motor-holding bracket 103 drives the conveyor belts 52 by the rotating of a sprocket 104 which drives a chain 61. Chain 61 rides on idler sprocket 106 which is pinned at 107 to brackets 108 attached to the frame 85 and also wraps around sprockets 110 and 111. Sprockets 110 is connected by shaft 62 to sprocket Y which drives chain 112, therefore driving sprockets 113 which is connected to pulley 55 for actuating one of the conveyor belts 52. Similarly, sprocket 111 is connected by shaft A to sprocket B which drives chain 114 therefore driving sprocket 115 which is connected to the other pulley 55 for driving the other conveyor belt 52. This arrangement allows one hydraulically actuated motor to drive both belts simultaneously at the same speed upon actuation by an operator who can simultaneously actuate juxtaposed motors 60 and 83 which motors would normally be run together.

As can be more clearly seen in FIG. 6, plants 51 are picked from the soil 50 by the ends of the belt 52 passing around the pulleys 54. As the plants are conveyed along the inner portions of the belt 52, they are pulled from the earth and pass over the rotating flaps 80 where the roots are cleaned of dirt and chaff and then the plants are passed to the other end of the conveyor system. The belts have belt covers 116 fitting thereover. It should, of course, be clear that other belt drive and support means can be utilized without departing from the spirit and scope of the invention.

Figures 7, 8:
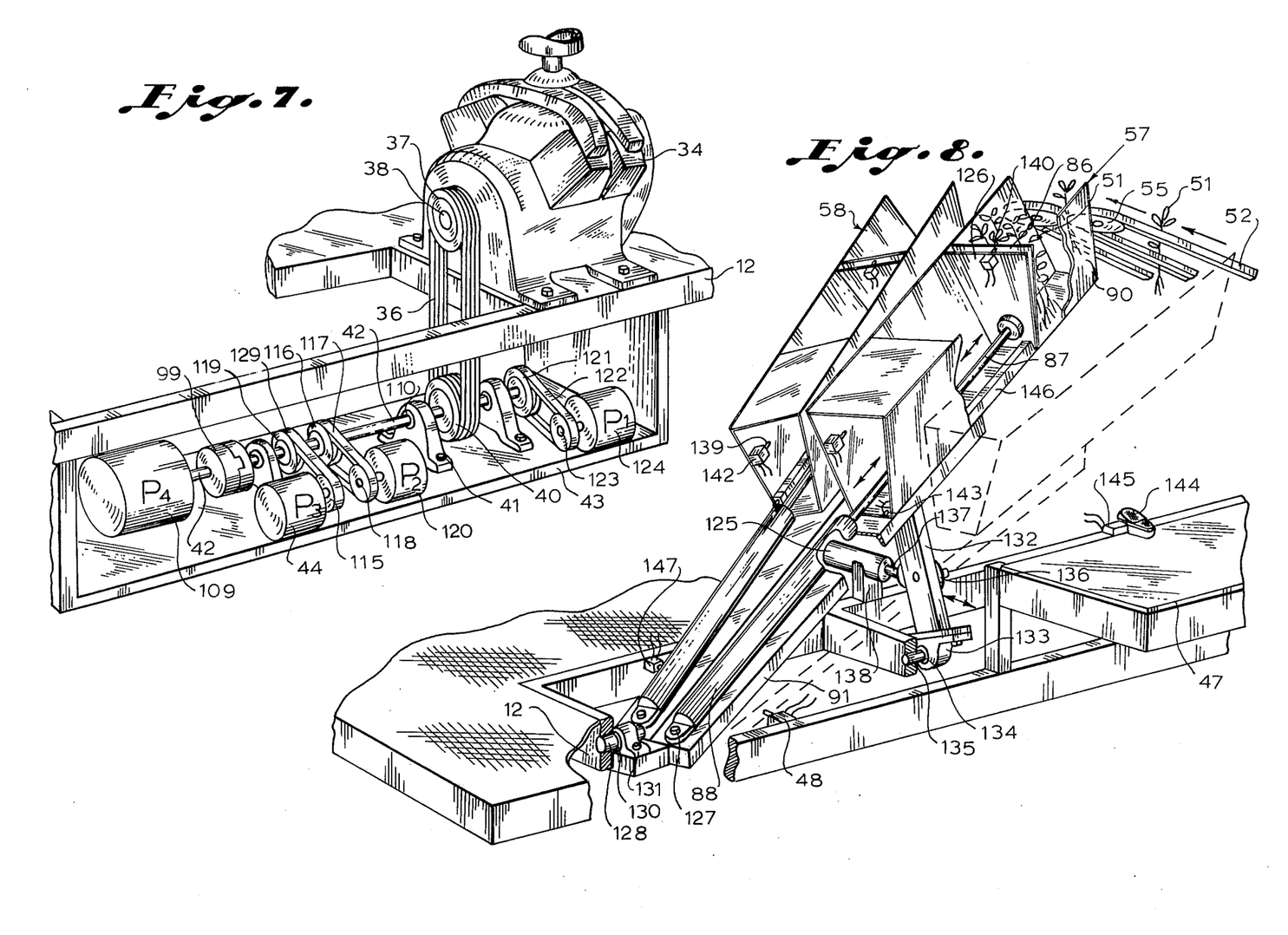
FIG. 7 is a perspective view of the engine mounted to the machine frame and drive mechanism.
FIG. 8 is a perspective view of a pair of cooperating loading boxes.

FIG. 7 illustrates the power source for the hydraulic system having an engine 34 mounted to the chassis 12 and driving a pulley 37 mounted to the engine shaft 38 for driving a plurality of belts 36. Belts 36 in turn drive the pulley 40 fixedly attached to the shaft 42 for rotating the shaft 42 by the engine 34. Shaft 42 is mounted to a plurality of bearings 110 supported by bearing brackets 41 attached to the transmission frame 43. Shaft 42 has a coupling 99 for driving a hydraulic pump 109 and has a pulley 119 driving a belt 129 for driving a pulley 139 and a pump 44 and has a similar pulley 116 driving a belt 117 and pulley 118 for driving a pump 120, and a similar pulley 121 for driving a belt 122 and a pulley 123 for driving a pump 124. Each individual pump is used to drive different hydraulic motors at different speeds when actuated. For instance, the coupled pump 109 can be utilized to drive the hydraulic motor 30 which drives the rear wheels for propelling the chassis and apparatus in a forward or reverse direction while the other pumps are used to drive the hydraulic steering cylinders 21, the hydraulic lift cylinders 76, the hydraulic motors 60 and 83 and the hydraulic cylinder 88 as well as the hydraulic cylinders 125 illustrated in FIG. 8.

Turning now to FIGS. 8 through 11, the plant receiving boxes (or magazines) 57 and 58 have bottom packing members 86 for receiving plants from the conveyor belts 52 wrapped around the end rollers 55 and are adjacent to the bottom member 86. Bottom members 86 have movably mounted members 89 movably attached to fixed plates 126 which have been shorted to prevent the moving member from engaging an operator's finger between the bottom members. Bottoms 126 are attached to the hydraulic cylinder 88, with rod 87 which is in turn pinned with pins 127 of the box support frames 91 which are also pinned with a shaft 128 riding in a bushing 130 and bracket 131 which is attached to the chassis 12. Frame 91 is further supported by a support arm 132 attached to the bottom thereof and attached to a bracket 133 having a bushing 134 riding on a shaft 135 attached to a portion of the chassis 12. Also attached to the support arm 132, which movably rides on the shaft 135, is a bracket 136 pinned to hydraulic cylinder rod 137 of hydraulic cylinder 125. Hydraulic cylinder 125 is mounted to a support bracket 138 which in turn is attached to the chassis 12. Actuation of the hydraulic cylinder 125 will thereby shift arm 132 back and forth on the shaft 135 thereby shifting the frame 91 from one side to the other and back. This allows boxes 57 and 58 to shift in front of the belts 52 for receiving plants. As the plants 51 are received from the belts 52 they are fed into the special shaped boxes 90 and force the bottom 86 to slide pushing the rod 87 into the hydraulic cylinder 88. Each time a pressure is applied against the bottom plate 86 it pushes against a pin 140 which activates a microswitch 141. The bottom 126 is connected to rod 87 and is actuated by the microswitch 141 which actuates hydraulic cylinder 88 thereby allowing more and more plants to push the bottom 86 further and further back into the box portion 90. When the rear wall 126 reaches the bottom of its travel, it will actuate a microswitch 142 which will in turn actuate the hydraulic cylinder 125 to shift the frame 91 thereby shifting box 57 from in front of the belts 52 and align the box 58 in front of the belts 52. Box 57 at this point is fully loaded and a cardboard box 93 having the same shape as the loading container 90 can be slipped over it and a microswitch 145 actuated to actuate the hydraulic cylinder 88 to push the rod 87, bottom 126 and bottom 86 forward thereby driving all of the plants 51 out along with the box 93 thereby filling the box 93 and removing it from the loading container 57. The box can then be closed and placed on a conveyor 94 as in FIG. 3 and allowed to slide onto the platform 96. Platform 47 has a foot pedal 144 for actuating microswitch 145 for actuating the hydraulic cylinder 88 for driving the hydraulic cylinder rod 87 to drive the bottom 26 and 86 pushing the plants out of the box portion 90 into a box 93 by an operator standing on the platform 47. A microswitch 143 is attached to an elongated metal bar 146 which is attached to the bottom 126 to actuate the stopping of the bottom 26 when the bottom 126 reaches a predetermined level. A pair of microswitches 147 and 148 are attached to the chassis 12 and actuated by the movement of the frame 91 from one side to the other for stopping the movement of the frame 91 and boxes 57 and 58 when shifting from one loading box to another.

Figure 9:
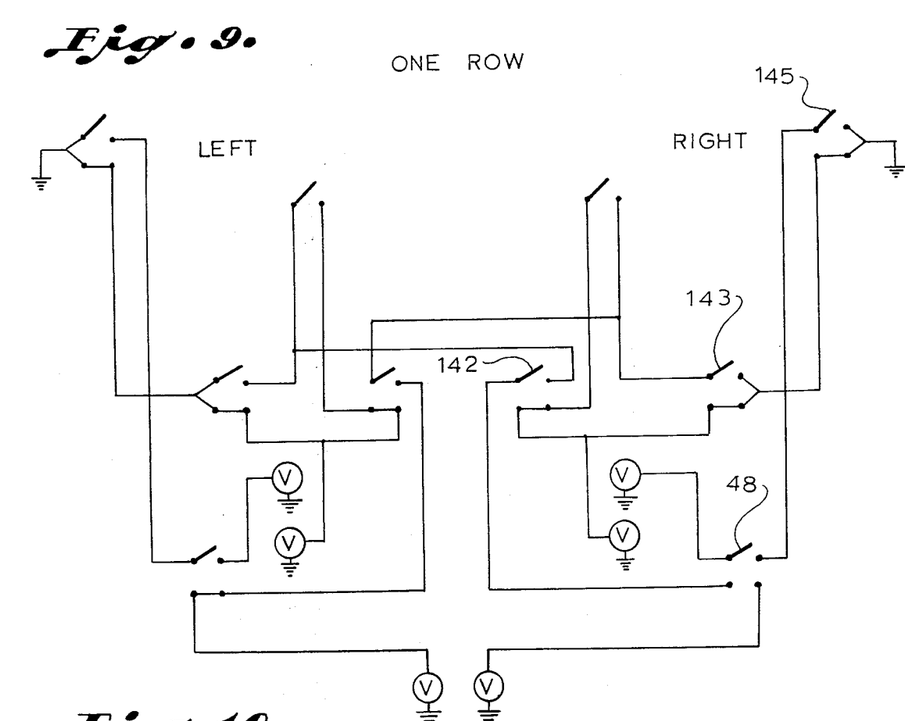
FIG. 9 is an electrical diagram of the switching system for operating the loading boxes of FIG. 8.
Figure 10:
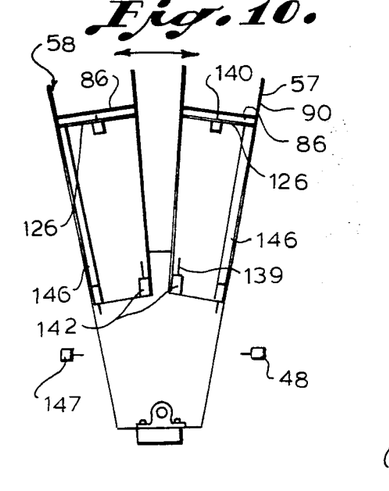
FIG. 10 illustrates the layout of microswitches for actuating the loading boxes.
Figure 11:
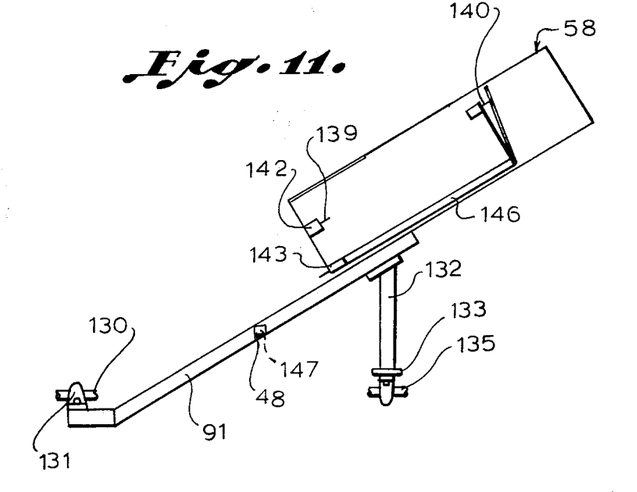
FIG. 11 illustrates a side layout illustrating the position of microswitches.

The operation of the microswitches is more clearly illustrated in FIGS. 9 through 11 in which a schematic diagram of FIG. 9 corresponds to the numbers and letters in the layouts of FIGS. 10 and 11 with microswitches (a) and (b) corresponding to microswitches 141 of FIG. 8, and microswitches 5 and 6 corresponding to microswitches 142 of FIG. 8, and microswitches 1 and 2 corresponding to microswitches 145 of FIG. 8, and microswitches 3 and 4 corresponding to microswitches 143 of FIG. 8, and microswitches 7 and 8 corresponding to microswitches 147 and 148. Each pair of boxes is illustrated in FIG. 9 as having a left hand box 58 and a right hand box 57, each having interconnecting controls. In FIGS. 10 and 11, the frame 91 is illustrating rotating on shaft 130 of brackets 131 and supported by the arm 132 riding on shaft 135 and bracket 133 with boxes 57 and 58 having bottoms 86 and second bottoms 126 with extending microswitch support rods 146. The microswitches are actuated automatically except for the operation of the foot pedal 144 of FIG. 8, as described in connection with FIG. 8.

Figure 12:
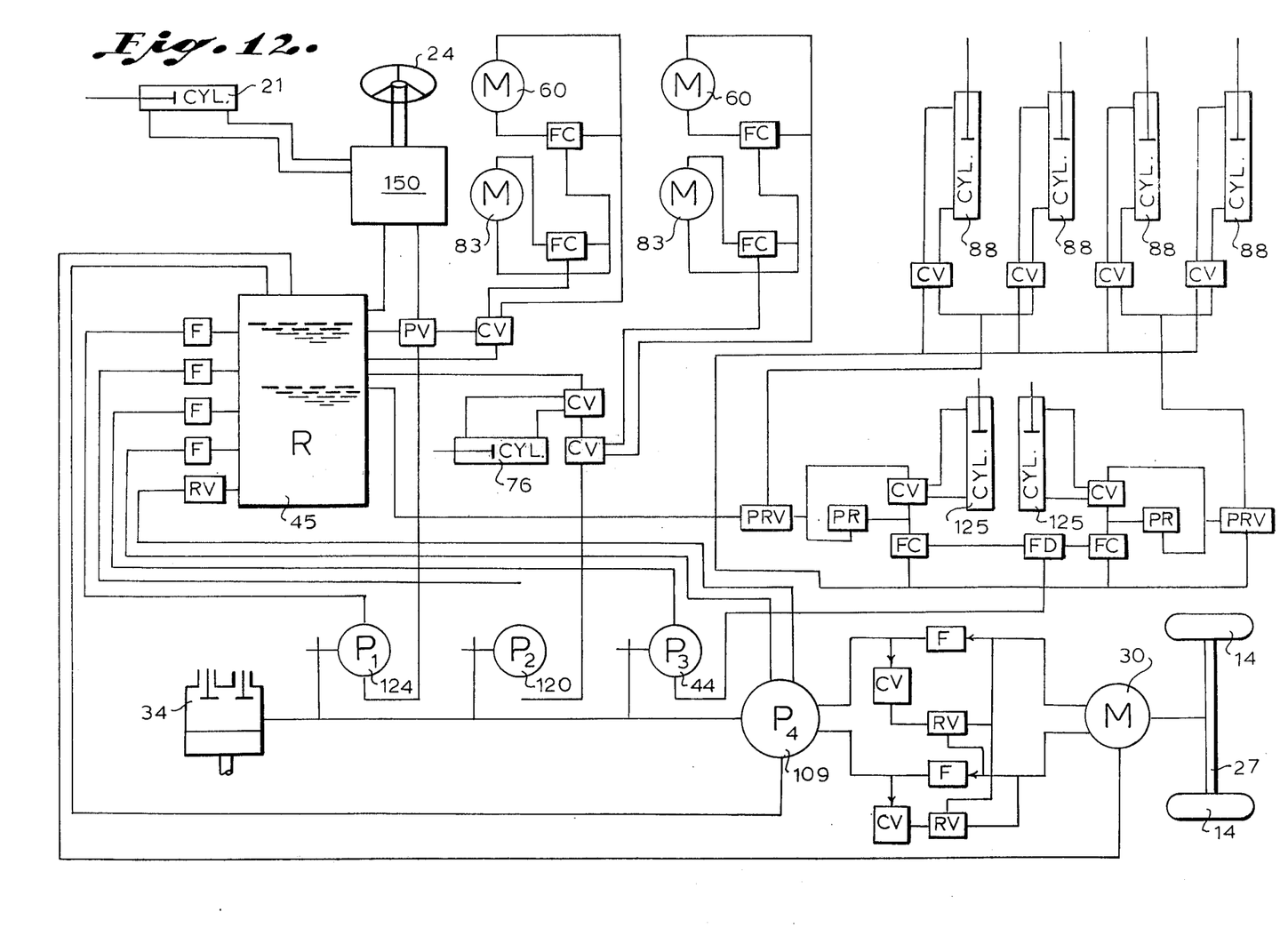
FIG. 12 is a schematic diagram of the hydraulic system.

Referring now to FIG. 12, a schematic diagram of the hydraulic system of the present invention is illustrated in which the steering wheel 24 actuates the power steering control valve 150 which operates the power steering cylinder 21 for steering the vehicle. The power steering valve 150 is connected to the hydraulic reservoir 45. The hydraulic reservoir supplies fluid through a filter "F" to the pump P1 (124) which pump is driven by the gasoline engine 34 and drives the power steering control 150 through the pilot valve Pv for controlling the operation of the cylinder 21. In a similar manner, the reciprocating gas engine 34 drives pump P2 (120), P3 (44) and P4 (112) which are connected for return to the reservoir 45 through a filter "F". The pump P4 is connected through control valves, filters and relief valves, as illustrated, to drive the motor 30 which drives the axle 27 and the rear wheels 14 of the vehicle. The control valves allow the motor 30 to be driven in a forward or reverse direction upon actuation of the control valves. In a similar manner, pump P2 passes through a control valve to actuate cylinder 76 which is used to pick up or lower the picking head of the plant picker and conveyor portions of the apparatus for making adjustments. The pump P2 also controls one of the motors 60 and one of the motors 83 which are, in the present apparatus, the right hand of two sets of motors 60 and motors 83 which operate its flow control valves and which motors 60 actuates the conveyor belts for driving the conveyor belts for picking up the plants and conveying them while the motor 83 actuates the rotating root cleaning blades of the apparatus. The left hand motors 60 and 83 are driven by pump 124 through the pilot valve through control valves and flow control valves. Hydraulic cylinders 125 move the plant receiving boxes and support frames or magazines and are driven by pump P3 (44) through a flow division valve, through flow control valves and through control valves for moving the left and right hand box support frames from one position, having one plant receiving magazine in front of the end of the conveyor, to a second position having a second plant receiving magazine juxtaposed in front of the end of the conveyor. One cylinder works for each pair of plant receiving magazines. This pump also, through the pressure relief valves (PRV), drives the related cylinders 88, one of which is connected to each plant receiving box or magazine and is actuated by the pressure relief valves to allow each cylinder rod to be gradually pushed into each cylinder 88. The control valves may be actuated for driving the cylinder rods of cylinder 88 all the way out for removing the plants from the plant boxes into packaging containers. All of the components of the hydraulic system are conventional hydraulic motors, pumps, and valves. The control valves may be solenoid actuated valves which are automatically actuated upon predetermined conditions.

It should be clear at this point that a tomato plant harvesting or picking and packing machine has been provided in which the plants are easily loaded into cardboard boxes, readily available for immediate transfer to transport. It should, however, be clear that other embodiments are contemplated as being within the scope of the invention and that the embodiment disclosed can be considered illustrative rather than restrictive.

We claim:

1. A plant pulling and packing machine comprising in combination:
   a. a wheeled frame;
   b. a power source operatively connected to at least one wheel and attached to said frame for driving said wheeled frame when actuated;
   c. at least one pair of parallel mounted endless belt means supported by said frame for gripping and transporting plants between parallel belts of said means;
   d. loading box means for receiving plants being fed thereto by said parallel belts of said belt means, said loading box means for receiving plants having a fluid driven movable bottom shifting in response to plants being fed thereinto; and
   e. means for cleaning roots of said plants being fed thereby by said endless belts.

2. The machine in accordance with claim 1 in which said loading box means' movable bottom includes a microswitch juxtaposed against said bottom for moving said bottom when said microswitch is actuated by pressure on the bottom of said loading box means.

3. The machine in accordance with claim 2 in which each loading box means includes a pair of loading boxes attached together and movable together to move the opening of one loading box out of the front of the end of said endless belt means while moving the second of said loading boxes into position for receiving plants from said end of said endless belt means.

4. The machine in accordance with claim 3 in which each said loading box of said loading box means includes a microswitch mounted to be actuated when said bottom of said box reaches a predetermined point for shifting said loading boxes to bring the other of said pair of loading boxes into position for receiving plants.

5. The machine in accordance with claim 4 in which said loading box has means for actuating said fluid driven bottom to push said bottom for removing said plants and said loading box into a separate loading container.

6. The machine in accordance with claim 5 having a conveyor mounted thereon for directing boxes filled from said box means to a frame mounted platform on said wheeled frame.

7. The machine in accordance with claim 6 in which said wheeled frame has platforms for operating personnel to stand upon.

8. The machine in accordance with claim 7 in which said parallel mounted endless belt means is rotatably attached to said wheeled frame at one end and is attached through linkage to a hydraulic cylinder at the other end for raising and lowering said other end for adjustment to rows of plants being picked.

9. The machine in accordance with claim 7 in which said pair of parallel mounted endless belt means are angled upwardly from said lower plant picking end.

10. The machine in accordance with claim 1 in which each of said pair of parallel mounted endless belt means includes a pair of endless conveyor belts each having idlers alternately mounted relatively to the idlers of the other endless conveyor belt for maintaining said belts in predetermined position.

11. The machine in accordance with claim 10 in which there are two pairs of parallel mounted endless belt means and two pair of loading means for receiving plants operating side by side.

12. The machine in accordance with claim 7 in which said power source is operatively connected to hydraulic pumps generating hydraulic pressure for driving said wheeled frame and for operatively driving said parallel mounted endless belt means and said loading box means responsive to controls from a central control box.

13. In a plant pulling and packing machine having a wheeled frame and a plant pulling and conveying means attached to said wheeled frame for picking plants from the earth and transporting the plants for packaging, wherein the improvement comprises in combination therewith:
  a plant packing magazine located adjacent one end of said plant conveying means for receiving plants being picked and conveyed, said packing magazine having a receiving container and a backing plate located therein whereby received plants in said magazine are compressed against said backing plate;
  backing plate actuating means attached to said backing plate for shifting said backing plate in said magazine responsive to predetermined pressure thereagainst by plants being received therein; and
  means for removing said plants from said magazine into packaging containers.

14. The apparatus in accordance with claim 13 in which said backing plate is attached to a hydraulic cylinder rod and is shifted by actuation of said hydraulic cylinder.

15. The apparatus in accordance with claim 14 in which said backing plate is movably attached to said hydraulic cylinder rod and has a microswitch mounted thereon in spaced relationship to the backing plate for actuating said hydraulic cylinder when said backing plate is pushed thereagainst responsive to pressure from plants being received in said magazine.

16. The apparatus in accordance with claim 15 in which said backing plate has a movable portion movably attached to a fixed portion fixedly attached to said hydraulic cylinder rod and said microswitch is attached to said fixed portion of said backing plate for actuation by said movable portion.

17. The apparatus in accordance with claim 13 in which a pair of plant packing magazines are attached adjacent each other to a magazine frame, said frame being movable to shift one magazine from the one end of said conveying means and simultaneously locating the second magazine adjacent the one end of said plant conveying means.

18. The apparatus in accordance with claim 17 in which a microswitch is located to indicate when the backing plate has reached its end of travel position and the a fluid driven is connected to shift said frame holding said pair of magazines from a first position to a second position upon said microswitch being actuated by one magazine backing plate actuating said microswitch at its end of travel position.

19. The apparatus in accordance with claim 18 in which two pair of magazines are mounted to a self-propelled wheeled frame.

20. The apparatus in accordance with claim 13 in which said means to remove plants from a magazine includes said plant packing magazine being shaped to have a packaging container fit thereover and has means for actuating a fluid cylinder to drive said backing plate to push a loaded magazine back into its starting position thereby pushing plants from said magazine into said packaging container.

21. The apparatus in accordance with claim 16 in which said fixed backing plate is shorter than said movable backing plate thereby preventing the entrapment of objects therebetween.

* * * * *